(12) United States Patent
Koike et al.

(10) Patent No.: US 11,913,400 B2
(45) Date of Patent: Feb. 27, 2024

(54) ABNORMALITY DIAGNOSTIC METHOD FOR INTERNAL COMBUSTION ENGINE AND ABNORMALITY DIAGNOSTIC DEVICE FOR INTERNAL COMBUSTION ENGINE

(71) Applicant: NISSAN MOTOR CO., LTD., Yokohama (JP)

(72) Inventors: Yusuke Koike, Kanagawa (JP); Takeshi Miyamoto, Kanagawa (JP); Hitoshi Ishii, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/908,473

(22) PCT Filed: Mar. 2, 2020

(86) PCT No.: PCT/JP2020/008627
§ 371 (c)(1),
(2) Date: Aug. 31, 2022

(87) PCT Pub. No.: WO2021/176500
PCT Pub. Date: Sep. 10, 2021

(65) Prior Publication Data
US 2023/0340922 A1 Oct. 26, 2023

(51) Int. Cl.
*F02D 41/22* (2006.01)
*F01M 11/10* (2006.01)
(Continued)

(52) U.S. Cl.
CPC .............. *F02D 41/22* (2013.01); *F01M 11/10* (2013.01); *F02D 41/0002* (2013.01);
(Continued)

(58) Field of Classification Search
CPC .... F02D 41/22; F02D 41/0002; F02D 41/042; F02D 41/3076; F02D 2200/04; F01M 11/10; F01M 2013/0038; G07C 5/0808
(Continued)

(56) References Cited

U.S. PATENT DOCUMENTS 7,509,210 B2 * 3/2009 Tsuda .................... F02M 25/06
73/118.02
8,181,509 B2 * 5/2012 Ibuki ....................... F02B 37/16
73/114.77
(Continued)

FOREIGN PATENT DOCUMENTS

| JP | 2008-057498 A | 3/2008 |
| JP | 2019-152197 A | 9/2019 |
| JP | 2020-012436 A | 1/2020 |

*Primary Examiner* — Hai H Huynh
(74) *Attorney, Agent, or Firm* — Foley & Lardner LLP

(57) ABSTRACT

During a predetermined operation state in which the opening degree of a throttle valve is fixed, an air flow meter positioned more on the upstream side than a pressure control valve detects a first intake air amount when the opening degree of the pressure control valve positioned on the upstream side of the throttle valve is set to a predetermined first valve opening degree and a second intake air amount when the opening degree of the pressure control valve is set to a predetermined second valve opening degree smaller than the first valve opening degree. On the basis of the first intake air amount and the second intake air amount, a diagnosis is made regarding whether there is an abnormality in a first pipe, a second pipe, a third pipe and the like which are included in a blow-by gas recirculation system for blow-by gas treatment.

7 Claims, 5 Drawing Sheets

(51) Int. Cl.
*F02D 41/00* (2006.01)
*F02D 41/04* (2006.01)
*F02D 41/30* (2006.01)
*G07C 5/08* (2006.01)
*F01M 13/00* (2006.01)

(52) U.S. Cl.
CPC ....... F02D 41/042 (2013.01); F02D 41/3076 (2013.01); G07C 5/0808 (2013.01); *F01M 2013/0038* (2013.01); *F02D 2200/04* (2013.01)

(58) Field of Classification Search
USPC .......... 123/336, 399, 442, 568.19, 572, 574, 123/198 D; 701/103, 107; 73/114.31, 73/114.32, 114.33, 114.34, 114.37
See application file for complete search history.

(56) References Cited

U.S. PATENT DOCUMENTS

| | | | |
|---|---|---|---|
| 8,522,551 B2 * | 9/2013 | Tomita | F02B 37/013 |
| | | | 123/562 |
| 8,789,517 B2 * | 7/2014 | Narita | F01M 13/022 |
| | | | 123/572 |
| 11,242,814 B2 * | 2/2022 | Muto | F02D 41/22 |
| 2001/0010214 A1 * | 8/2001 | Maegawa | F02M 25/06 |
| | | | 73/114.37 |
| 2008/0058994 A1 | 3/2008 | Tsuda et al. | |

* cited by examiner

ABNORMALITY DIAGNOSTIC METHOD FOR INTERNAL COMBUSTION ENGINE AND ABNORMALITY DIAGNOSTIC DEVICE FOR INTERNAL COMBUSTION ENGINE

TECHNICAL FIELD

The present invention relates to an abnormality diagnostic method and abnormality diagnostic device for an internal combustion engine to diagnose whether or not there is an abnormality in a blow-by gas recirculation system for recirculating blow-by gas to an intake passage.

BACKGROUND TECHNOLOGY

For example, a patent document 1 discloses a technology in which, during a predetermined operation state, such as a fuel cut operation state in which fuel supply to an internal combustion engine is stopped, on the basis of an intake air amount detected by an airflow meter after the closing or opening of an intake throttle valve, an abnormality due to, for example, coming-off (falling-off) of a blow-by gas passage connected to an intake passage on the downstream side of the airflow meter from the intake passage is detected.

In the patent document 1, in case where the blow-by gas passage comes off from the intake passage, the inflow of air or flowing out of intake air occurs at the part where the blow-by gas passage comes off. Consequently, during a transient period in which the opening degree of the intake throttle valve is varied, there is the difference in the intake variation amount (integrated value) until the intake air amount detected by the airflow meter becomes stable, between a normal case where the blow-by gas passage does not come off from the intake passage and an abnormal case where the blow-by gas passages comes off from the intake passage.

Therefore, the abnormality determination device in the patent document 1 is configured to determine whether or not there is an abnormality in the blow-by gas passage, based on the intake air amount detected by the airflow meter during a transient period in which the opening degree of the intake throttle valve is varied.

However, in the patent document 1, when the opening degree of the intake throttle valve is set small, the intake air amount detected by the airflow meter becomes small regardless of the presence of the abnormality in the blow-by gas passage, and there is therefore possibility that an abnormality in the blow-by gas passage cannot be accurately detected.

That is, there is some room for improvement in accurate detection of an abnormality in a blow-by gas recirculation system of an internal combustion engine.

PRIOR ART DOCUMENT

Patent Document

Patent Document 1: Japanese Patent Application Publication 2008-57498

SUMMARY OF THE INVENTION

In the abnormality diagnosis of an internal combustion engine in the present invention, during a predetermined operation state in which the opening degree of a first intake throttle valve for controlling the intake air amount of the internal combustion engine is fixed, on the basis of a first intake air amount when the opening degree of a second intake throttle valve positioned on the upstream side of the first intake throttle valve is set to a predetermined first valve opening degree and a second intake air amount when the opening degree of the second intake throttle valve is set to a predetermined second valve opening degree smaller than the first valve opening degree, the presence of an abnormality in a blow-by gas recirculation system for blow-by gas treatment is diagnosed.

In the blow-by gas recirculation system, in case where there is an abnormality such as coming-off (falling-off) of components and forming of a hole in pipes constituting passages through which blow-by gas flows, air enters thereinto from a part where the abnormality occurs.

Therefore, in case where there is an abnormality such as coming-off (falling-off) of components and forming of a hole in the blow-by gas recirculation system, the intake air amount detected by an intake air amount detecting sensor when the second intake throttle valve is closed decreases as compared with an intake air amount detected by the intake air amount detecting sensor when the second intake throttle valve is opened.

According to the present invention, by using the first intake air amount and the second intake air amount, it is possible to accurately diagnose the presence of an abnormality in the blow-by gas recirculation system.

MODE FOR IMPLEMENTING THE INVENTION

In the following, one embodiment of the present invention will be explained based on the drawings.

Figure 1:
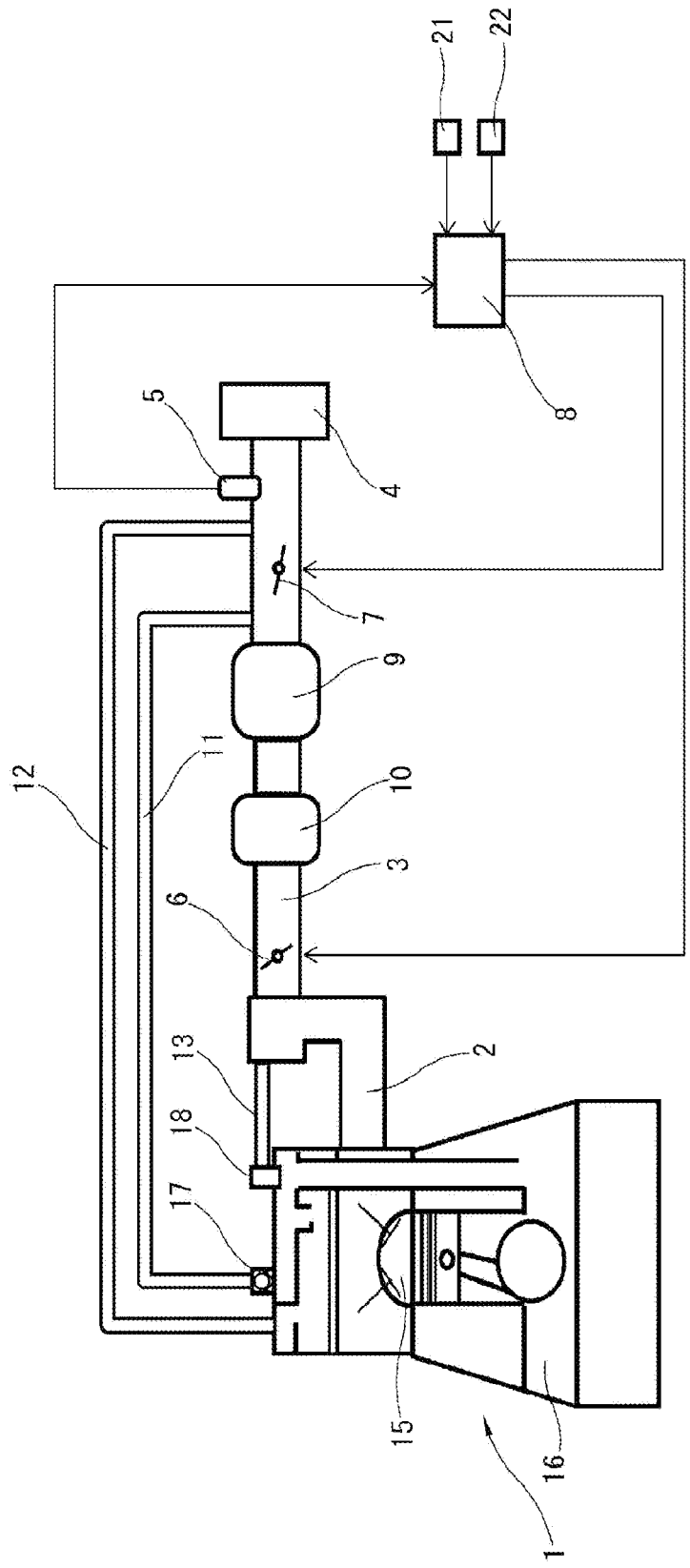
FIG. 1 is an illustrative view schematically showing the system configuration of an internal combustion engine according to the present invention.

FIG. 1 is an illustrative view schematically showing the system configuration of an internal combustion engine according to the present invention.

An internal combustion engine 1 is, for example, a multiple-cylinder spark ignition gasoline engine, and is mounted on a vehicle such as an automobile as a driving source.

An intake passage 3 is connected to the cylinders of internal combustion engine 1 via an intake manifold 2.

Intake passage 3 is provided with an air cleaner 4 for collecting foreign substances in intake air, an airflow meter 5 for detecting an intake air amount, an electric throttle valve 6, and an electric pressure control valve 7 positioned on the upstream side of throttle valve 6.

Airflow meter 5 corresponds to an intake air amount detecting sensor, and is positioned on the upstream side of pressure control valve 7. Airflow meter 5 incorporates a temperature sensor so as to be able to detect the intake air temperature at an intake introducing port.

Air cleaner 4 is positioned on the upstream side of airflow meter 5.

Throttle valve 6 corresponds to a first intake throttle valve, and is configured to control the intake air amount of internal combustion engine 1 according to a load. Pressure control valve 7 corresponds to a second intake throttle valve, and is configured to control the intake pressure on the upstream side of the after-mentioned compressor 9. That is, pressure control valve 7 is capable of generating a negative pressure on the upstream side of throttle valve 6.

The opening degree of each of throttle valve 6 and pressure control valve 7 can be varied (controlled) by a control signal from an engine control module (ECM) 8 as a control section.

Here, on the downstream side of pressure control valve 7, an EGR passage which is not shown is connected. The EGR passage is one allowing to perform exhaust gas recirculation (EGR) for recirculating part of exhaust gas from an exhaust passage which is not shown to intake passage 3. The EGR passage is connected to intake passage 3, on the upstream side of the after-mentioned compressor 9. That is, an EGR gas amount recirculated to intake passage 3 can be controlled by the intake pressure (intake negative pressure) on the downstream side of pressure control valve 7 which results from the opening degree adjustment of pressure control valve 7.

In addition, internal combustion engine 1 includes a turbocharger. The turbocharger includes a compressor 9 provided in intake passage 3 and a turbine not shown which is provided in an exhaust passage not shown. Compressor 9 and the turbine are coaxially disposed, and integrally rotate. Compressor 9 is disposed at a position on the upstream side of throttle valve 6 and more on the downstream side than pressure control valve 7.

Intake passage 3 is provided with an intercooler 10 on the upstream side of throttle valve 6. Intercooler 10 is positioned on the downstream side of compressor 9, and is provided to cool intake air compressed (pressurized) by compressor 9 so as to improve filling efficiency.

In addition, internal combustion engine 1 includes a blow-by gas recirculation system for blow-by gas treatment which treats blow-by gas by introducing it into intake passage 3 by using a plurality of pipes connected at positions more on the downstream side than airflow meter 5 in intake passage 3. The blow-by gas recirculation system includes a first pipe 11, a second pipe 12 and a third pipe 13. Blow-by gas is combustion gas leaking from a combustion chamber 15 of internal combustion engine 1 to a crankcase 16 of internal combustion engine 1, while passing through the gap between a cylinder and a piston.

First pipe 11 is one which constitutes a first passage connecting (communicating) the position between throttle valve 6 and pressure control valve 7 in intake passage 3 with crankcase 16 of internal combustion engine 1. One end of first pipe 11 is connected to the position between throttle valve 6 and pressure control valve 7 in intake passage 3, and the other end is connected to internal combustion engine 1 via a check valve 17. Specifically, the one end of first pipe 11 is connected to the position between compressor 9 and pressure control valve 7 in intake passage 3. First pipe 11 (first passage) is one which allows to introduce blow-by gas inside crankcase 16 into intake passage 3.

Check valve 17 is part of the blow-by gas recirculation system, and has function to prohibit the flow in the direction from intake passage 3 to crankcase 16, while allowing the flow in the direction from crankcase 16 toward intake passage 3. In addition, check valve 17 may be omitted in some cases.

Second pipe 12 is one which constitutes a second passage connecting (communicating) the position between pressure control valve 7 and airflow meter 5 in intake passage 3 with crankcase 16 of internal combustion engine 1. One end of second pipe 12 is connected to the position between pressure control valve 7 and airflow meter 5 in intake passage 3, and the other end is connected to internal combustion engine 1. Second pipe 12 (second passage) is one which allows to introduce fresh air (air) into crankcase 16 of internal combustion engine 1.

Third pipe 13 is one which constitutes a third passage connecting (communicating) the position more on the downstream side than throttle valve 6 in intake passage 3 with crankcase 16 of internal combustion engine 1. One end of third pipe 13 is connected to the position more on the downstream side than throttle valve 6 in intake passage 3, and the other end is connected to internal combustion engine 1 via a PCV valve 18. Third pipe 13 is one which allows to introduce blow-by gas inside crankcase 16 into intake passage 3.

PCV valve 18 is part of the blow-by gas recirculation system, and is configured to control the flow rate of the gas inside third pipe 13. PCV valve 18 is, for example, a well-known differential pressure valve, and is attached to internal combustion engine 1, and is operated so as to be opened when the differential pressure between the pressure (positive pressure) at the inlet part on the crankcase 16 side and the pressure (negative pressure) at the outlet part on the intake pressure 3 side is large. Specifically, PCV valve 18 is configured to discharge blow-by gas from crankcase 16 toward intake passage 3 according to the differential pressure, while suppressing the backflow of outside air from intake passage 3 into crankcase 16 through third pipe 13. That is, by using the negative pressure more on the downstream side than throttle valve 6, it is possible to return blow-by gas to intake passage 3 via PCV valve 18 and third pipe 13.

ECM 8 is a well-known digital computer equipped with a CPU, a ROM, a RAM and an input/output interface. ECM 8 receives, in addition to the detection signal of the above-mentioned airflow meter 5, detection signals of various sensors, such as a crank angle sensor 21 for detecting the crank angle of a crankshaft and an accelerator opening sensor 22 for detecting the stepping amount of an accelerator pedal. Crank angle sensor 21 is one capable of detecting the engine speed of internal combustion engine 1. ECM 8 is configured to control the operation of internal combustion engine 1 on the basis of detection signals of various sensors.

Here, in case where there is an abnormality, such as coming-off of first pipe 11, second pipe 12 or third pipe 13, forming of a hole in first pipe 11, second pipe 12 or third pipe 13 or coming-off of PCV valve 18 from internal combustion engine 1, air enters thereinto from a part where the abnormality occurs.

The coming-off of first pipe 11 means that, for example, first pipe 11 comes off and falls off from check valve 17 or from an intake pipe constituting intake passage 3. The coming-off of second pipe 12 means that, for example, second pipe 12 comes off and falls off from internal combustion engine 1 or from an intake pipe constituting intake passage 3. The coming-off of third pipe 13 means that, for example, third pipe 13 comes off and falls off from PCV valve 18 or from an intake pipe constituting intake passage 3.

When pressure control valve 7 is closed in a state in which throttle valve 6 is opened, the intake air passing through airflow meter 5 inside intake passage 3 is returned to the downstream side of pressure control valve 7 via second pipe 12, crankcase 16 and third pipe 13. That is, the intake air which cannot pass through pressure control valve 7 inside intake passage 3 flows from second pipe 12 to first pipe 11 via crankcase 16 so as to bypass pressure control valve 7.

In addition, in case of an abnormality due to coming-off or forming of a hole in any of first pipe 11, second pipe 12 and third pipe 13, or in case where PCV valve 18 falls off from internal combustion engine 1, air enters from a part where the abnormality occurs.

Consequently, when the opening degree of throttle valve 6 is fixed, in case where there is an abnormality in the blow-by gas recirculation system, an intake air amount detected by airflow meter 5 when pressure control valve 7 is closed becomes smaller than an intake air amount detected by airflow meter 5 when pressure control valve 7 is opened.

Figure 2:
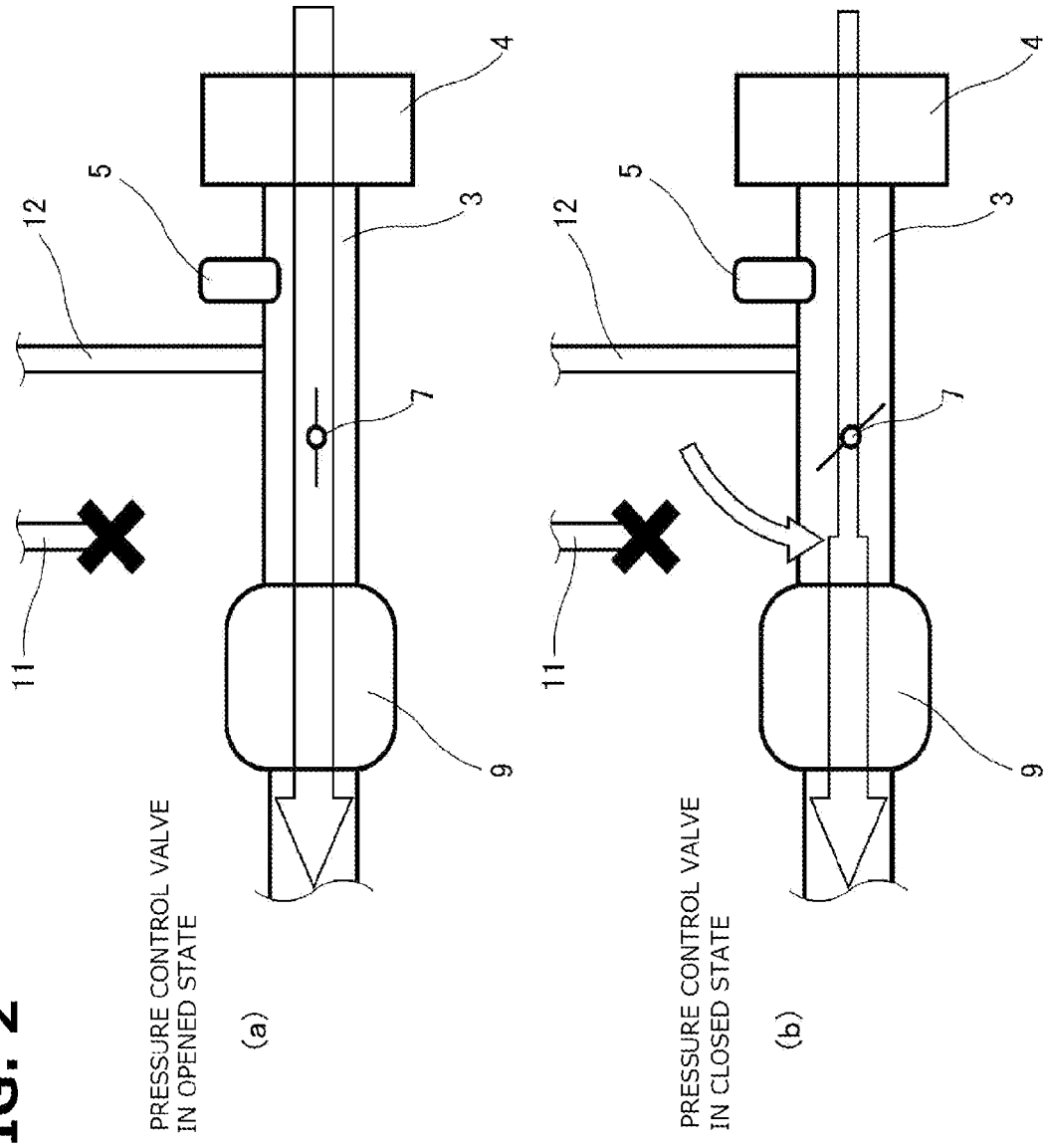
FIG. 2 is an illustrative view schematically showing the flow of intake air in case where coming-off of a pipe occurs in a blow-by gas recirculation system, and FIG. 2 (a) shows the flow of intake air in case where a pressure control valve is opened, and FIG. 2 (b) shows the flow of intake air in case where the pressure control valve is closed.

FIG. 2 is an illustrative view schematically showing the flow of intake air in case where coming-off of a pipe occurs in the blow-by gas recirculation system, and FIG. 2 (a) shows the flow of intake air in case where pressure control valve 7 is opened, and FIG. 2 (b) shows the flow of intake air in case where pressure control valve 7 is closed.

For example, as shown in FIG. 2, in case where one end of first pipe 11 comes off, when pressure control valve 7 is closed, outside air enters from a part where the one end of first pipe 11 had been connected in intake passage 3. Consequently, the intake air amount detected by airflow meter 5 decreases as compared with an intake air amount in case where pressure control valve 7 is opened.

Therefore, during a predetermined operation state in which the opening degree of throttle valve 6 is fixed and the engine speed of internal combustion engine 1 is fixed, ECM 8 diagnoses whether or not there is an abnormality in the blow-by gas recirculation system. That is, ECM 8 corresponds to a diagnosis section.

The diagnosis for an abnormality in the blow-by gas recirculation system is carried out as abnormality diagnosis of internal combustion engine 1, in case where, for example, a predetermined fuel cut condition is made during traveling of a vehicle and the fuel injection of internal combustion engine 1 is stopped, namely, in case where, for example, fuel cut during deceleration of a vehicle is carried out.

During a predetermine operation state in which the opening degree of throttle valve 6 is fixed and the engine speed of internal combustion engine 1 is fixed, the abnormality diagnosis for the blow-by gas recirculation system is carried out to diagnose the presence of an abnormality on the basis of a first intake air amount Q1 when pressure control valve 7 is opened and a second intake air amount Q2 when pressure control valve 7 is closed.

Here, first intake air amount Q1 is an intake air amount to be detected by airflow meter 5 when pressure control valve 7 is set to a predetermined first valve opening degree that is a predetermined large opening degree, during a predetermined operation state. Second intake air amount Q2 is an intake air amount to be detected by airflow meter 5 when pressure control valve 7 is set to a predetermined second valve opening degree smaller than the first valve opening degree, during a predetermined operation state. Since the larger the opening degree difference between the first valve opening degree and the second valve opening degree becomes, the higher the accuracy of the diagnosis becomes, it is desirable to set the first valve opening degree and the second valve opening degree such that the valve opening degree difference therebetween becomes large.

In addition, the abnormality diagnosis for the blow-by gas recirculation system may be carried out during the idle operation of internal combustion engine 1. In case where the motoring of internal combustion engine 1 can be performed, during the motoring, the abnormality diagnosis for the blow-by gas recirculation system can also be carried out.

For example, the abnormality diagnosis for the blow-by gas recirculation system is carried out only once per one trip from the turning on of a key switch of a vehicle until the turning off of the key switch. During performing the abnormality diagnosis for the blow-by gas recirculation system, when the opening degree of throttle valve 6 is varied, the abnormality diagnosis is stopped. When the abnormality diagnosis is stopped, the abnormality diagnosis is started from the beginning in a next chance.

Figure 3:
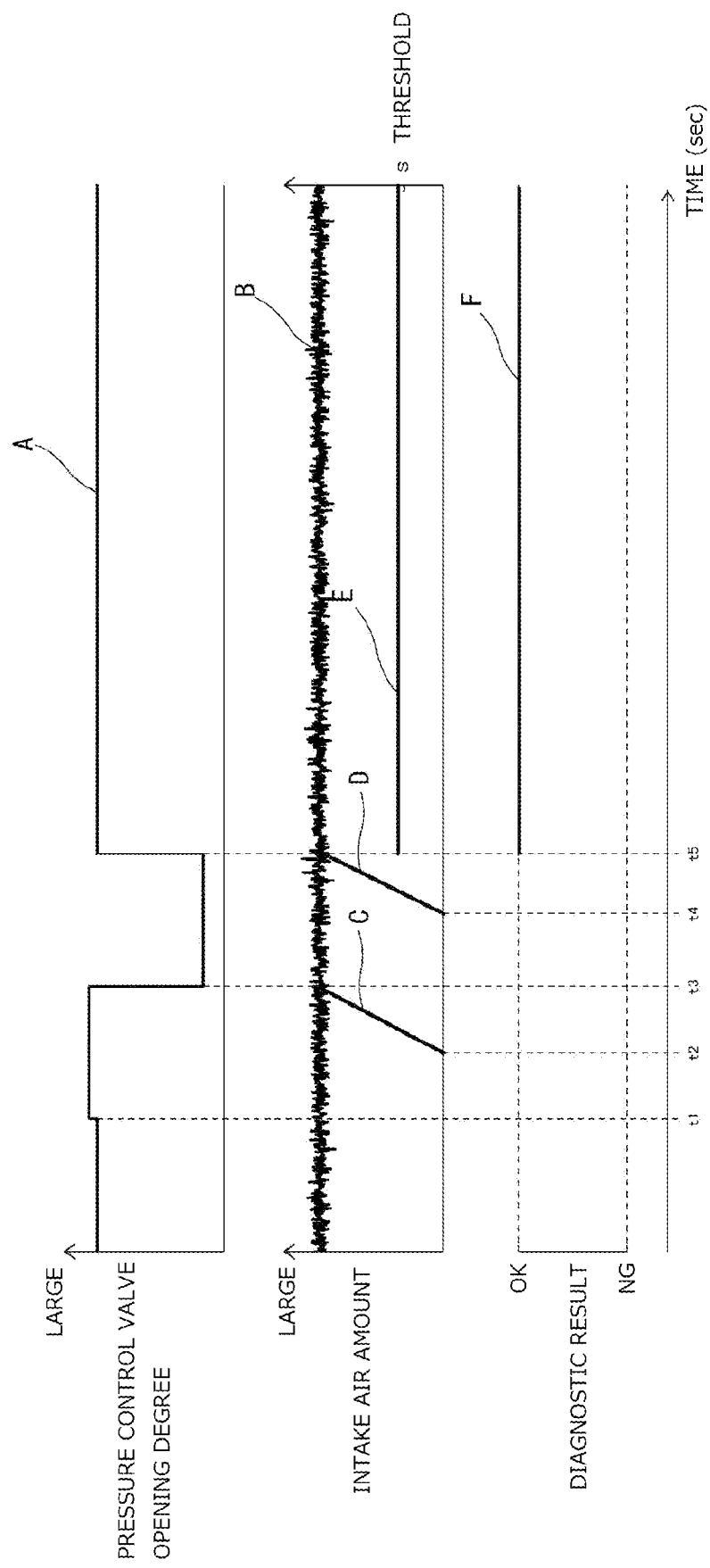
FIG. 3 is a timing chart showing the variation of the opening degree of the pressure control valve, an intake air amount and the like when an abnormality diagnosis of the blow-by gas recirculation system is carried out.
Figure 4:
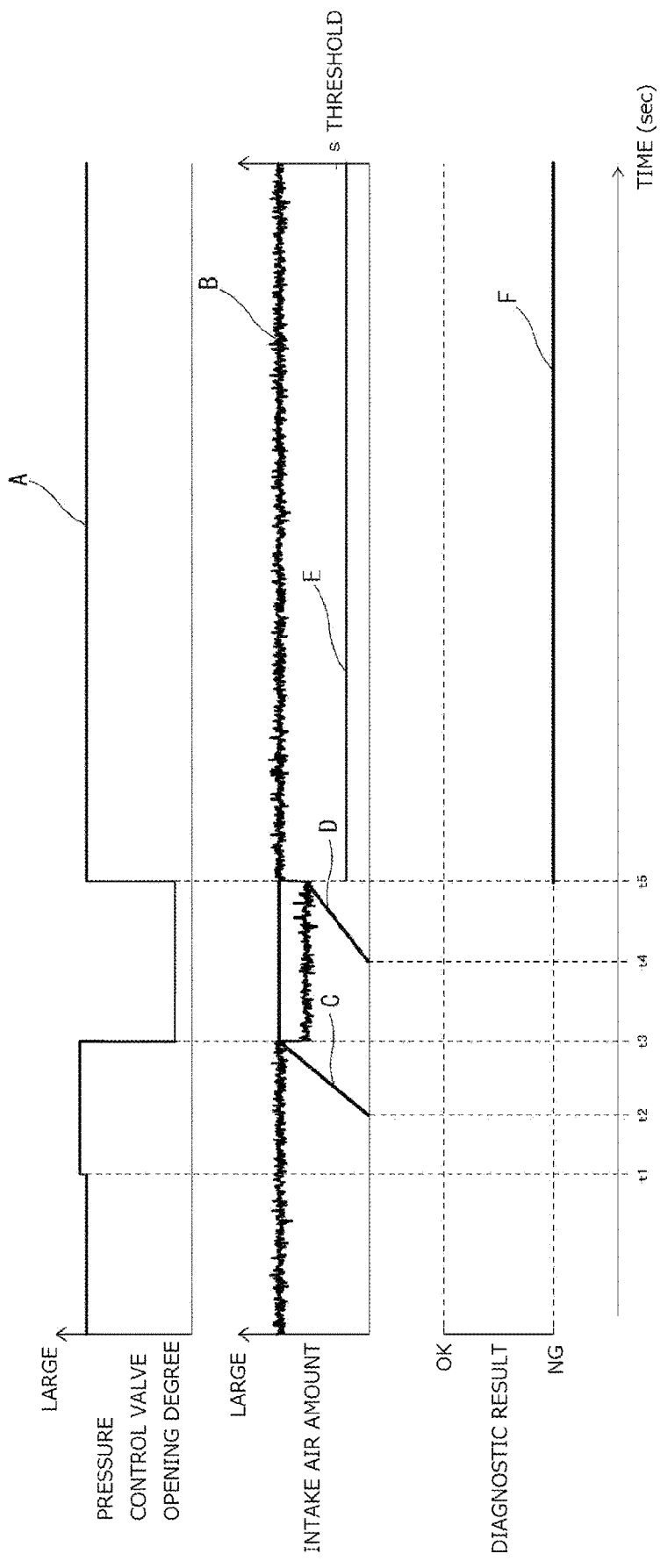
FIG. 4 is a timing chart showing the variation of the opening degree of the pressure control valve, an intake air amount and the like when an abnormality diagnosis of the blow-by gas recirculation system is carried out.

FIG. 3 and FIG. 4 each are a timing chart showing the variation of, for example, the opening degree of pressure control valve 7 and the intake air amount when the abnormality diagnosis of the blow-by gas recirculation system is carried out. FIG. 3 is a timing chart in case where the blow-by gas recirculation system is normal. FIG. 4 is a timing chart in case where there is an abnormality in the blow-by gas recirculation system.

A characteristic line A shown by a solid line in each of FIG. 3 and FIG. 4 indicates the opening degree of pressure control valve 7. A characteristic line B shown by a solid line in each of FIG. 3 and FIG. 4 indicates an intake air amount per unit time which is detected by airflow meter 5. Between time t1 and time t3, the intake air amount indicated by characteristic line B indicates the above-mentioned first intake air amount Q1, and between time t3 and time t5, it indicates the above-mentioned second intake air amount Q2. A characteristic line C shown by a broken line in each of FIG. 3 and FIG. 4 indicates an intake air amount detected by airflow meter 5. Between time t2 and time t3, the intake air amount indicated by characteristic line C indicates the integrated value of the intake air amount detected by airflow meter 5 from time t2, and between time t3 and time t5, it indicates the intake air amount per unit time. For convenience, in the drawings, characteristic line C indicates the intake air amount only in the period between time t2 and time t5. A characteristic line D shown by an alternate long and short dash line in each of FIG. 3 and FIG. 4 indicates an intake air amount detected by air flow meter 5. The intake air amount indicated by characteristic line D indicates the integrated value of the intake air amount detected by airflow meter 5 from time t4, between time t4 and time t5. At time t5, characteristic line D indicates the intake air amount per unit time. For convenience, in the drawings, characteristic line D indicates the intake air amount only in the period between time t4 and time t5. A characteristic line E shown by a thick solid line in each of FIG. 3 and FIG. 4 indicates a value obtained by dividing second intake air amount Q2 that is the intake air amount per unit time at time t5 by first intake air amount Q1 that is the intake air amount per unit time at time t3. A characteristic line F shown by a solid line in each of FIG. 3 and FIG. 4 indicates the determination result by the abnormality diagnosis.

In FIG. 3 and FIG. 4, time t1 is a timing at which the opening degree of pressure control valve 7 is varied from a normal valve opening degree according to an operation state to the first valve opening degree. That is, time t1 in each of FIG. 3 and FIG. 4 is a timing at which the abnormality diagnosis for the blow-by gas recirculation system is started.

In FIG. 3 and FIG. 4, time t2 is a timing at which a predetermined time has elapsed after the opening degree of pressure control valve 7 is varied to the first valve opening degree. For example, time t2 is a timing at which intake flow is stabilized after the opening degree of pressure control valve 7 is varied to the first valve opening degree.

In FIG. 3 and FIG. 4, time t3 is a timing at which a unit time (predetermined time) has elapsed after the integrating of the intake air amount is started at time t2, and is a timing at which the opening degree of pressure control valve 7 is varied from the first valve opening degree to the second valve opening degree.

In FIG. 3 and FIG. 4, time t4 is a timing at which a predetermined time has elapsed after the opening degree of pressure control valve 7 is varied to the second valve opening degree. For example, time t4 is a timing at which intake flow is stabilized after the opening degree of pressure control valve 7 is varied to the second valve opening degree.

In FIG. 3 and FIG. 4, time t5 is a timing at which a unit time (predetermined time) has elapsed after the integrating of the intake air amount is started at time t4. In addition, time t5 is a timing at which the opening degree of pressure control valve 7 is varied from the second valve opening degree to a normal valve opening degree according to an operation state, and is a timing at which the diagnostic result of the abnormality diagnosis for the blow-by gas recirculation system is output.

If there is no abnormality in the blow-by gas recirculation system, even if the opening degree of pressure control valve 7 is varied from the first valve opening degree to the second valve opening degree in a state in which the opening degree of throttle valve 6 is fixed, as shown in FIG. 3, the intake air amount detected by airflow meter 5 does not vary.

On the other hand, if there is an abnormality in the blow-by gas recirculation system, when the opening degree of pressure control valve 7 is varied from the first valve opening degree to the second valve opening degree in a state in which the opening degree of throttle valve 6 is fixed, as shown in FIG. 4, the intake air amount detected by airflow meter 5 varies.

Therefore, ECM 8 diagnoses that there is an abnormality in the blow-by gas recirculation system, when a value obtained by dividing second intake air amount Q2 that is the intake air amount per unit time when the opening degree of pressure control valve 7 is set to the second valve opening degree by first intake air amount Q1 that is the intake air amount per unit time when the opening degree of pressure control valve 7 is set to the first valve opening degree is equal to or less than a preset threshold S (for example, 0.8). Specifically, ECM 8 diagnoses that there is an abnormality due to coming-off or forming of a hole in any of first pipe 11, second pipe 12 and third pipe 13, or falling-off of PCV valve 18 from internal combustion engine 1, when a value obtained by dividing second intake air amount Q2 that is the intake air amount per unit time at time t5 by first intake air amount Q1 that is the intake air amount per unit time at time t3 is equal to or less than preset threshold S.

That is, the presence of an abnormality in the blow-by gas recirculation system can be diagnosed with high accuracy by using first intake air amount Q1 and second intake air amount Q2.

In addition, the abnormality diagnosis for the blow-by gas recirculation system is carried out in a predetermined operation state in which the opening degree of throttle valve 6 is fixed and the engine speed of internal combustion engine 1 is fixed. That is, since the abnormality diagnosis for the blow-by gas recirculation system is carried out under a condition in which the intake air amount of internal combustion engine 1 is fixed, it is possible to diagnose whether or not there is an abnormality in the blow-by gas recirculation system with high accuracy in this respect.

Figure 5:
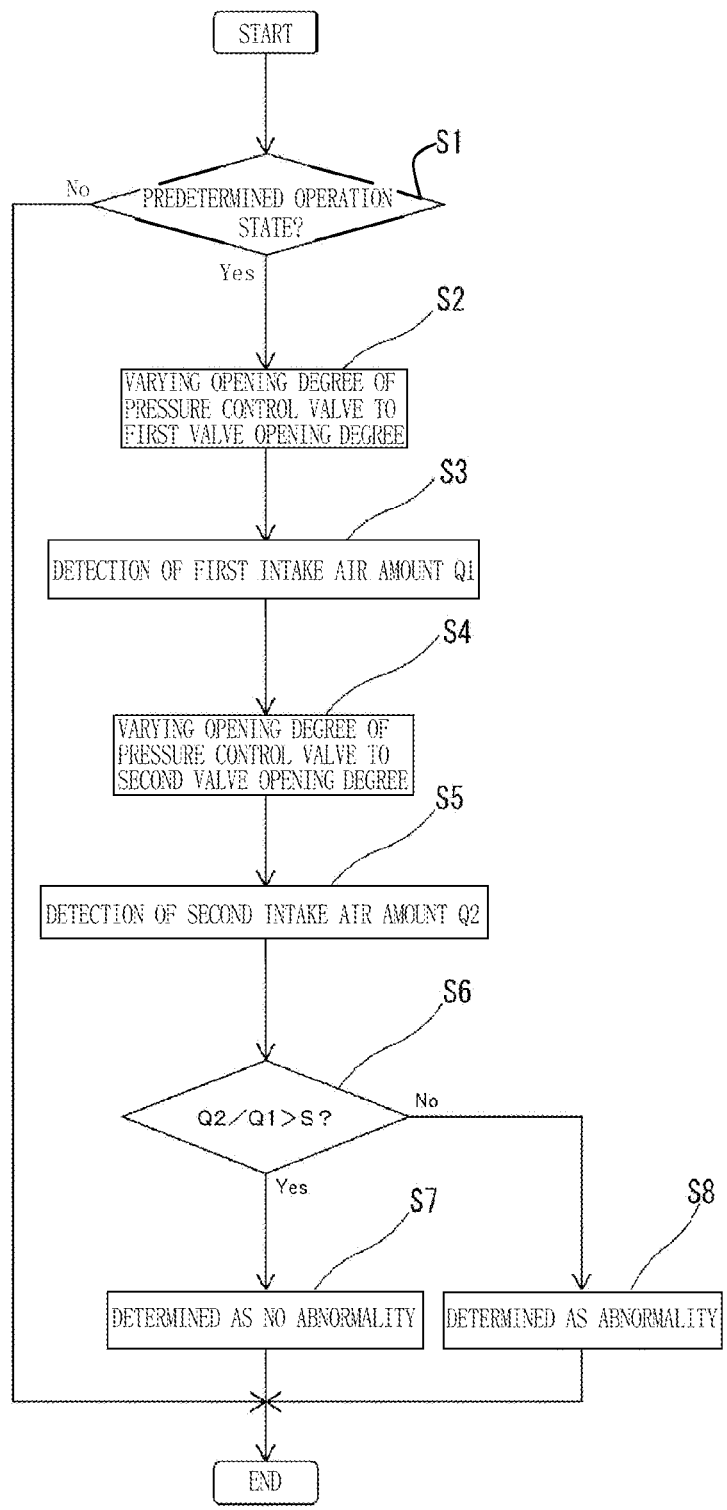
FIG. 5 is a flowchart showing one example of the flow of the control for an abnormality diagnosis of the internal combustion engine.

FIG. 5 is a flowchart showing one example of the flow of the control for the abnormality diagnosis of internal combustion engine 1 in the above-mentioned embodiment.

In a step S1, it is determined whether or not internal combustion engine 1 is in a predetermined operation state. In step S1, when internal combustion engine 1 is in a predetermined operation state in which the opening degree of throttle valve 6 and the engine speed are fixed, the process proceeds to a step S2, and when not, the routine this time is ended.

In step S2, the opening degree of pressure control valve 7 is varied to the first valve opening degree.

In a step S3, first intake air amount Q1 that is the intake air amount after the opening degree of pressure control valve 7 is varied to the first valve opening degree is detected.

In a step S4, the opening degree of pressure control valve 7 is varied to the second valve opening degree.

In a step S5, second intake air amount Q2 that is the intake air amount after the opening degree of pressure control valve 7 is varied to the second valve opening degree is detected.

In a step S6 it is determined whether or not the value obtained by dividing second intake air amount Q2 by first intake air amount Q1 is larger than threshold S. In step S6, when the value obtained by dividing second intake air amount Q2 by first intake air amount Q1 is larger than threshold value S, the process proceeds to a step S7, and when the value obtained by dividing second intake air amount Q2 by first intake air amount Q1 is equal to or less than threshold S, the process proceeds to a step S8.

In step S7, as a result of the diagnosis, it is determined that there is no abnormality.

In step S8, as a result of the diagnosis, it is determined that there is an abnormality.

In addition, during the period from when it is determined that internal combustion engine 1 is in a predetermined operation state in step S1 until when the determination of the diagnosis is made in step S7 or step S8, when the operation state (operation condition) of internal combustion engine 1 is changed and the opening degree of throttle valve 6, the engine speed of internal combustion engine 1 or the opening degree of an EGR valve provided in the EGR passage is varied, the abnormality diagnosis of internal combustion engine 1 is stopped.

As the above, although a specific embodiment of the present invention has been explained, the present invention is not limited to the above embodiment, and various modification can be performed without departing from the scope and spirit of the present invention.

For example, although, in the abnormality diagnosis for the blow-by gas recirculation system in the above embodiment, the opening degree of pressure control valve 7 is set to the second valve opening degree after being set to the first valve opening degree, the opening degree of pressure control valve 7 may be set to the first valve opening degree after being set to the second valve opening degree.

The present invention can also be applied to an internal combustion engine to be mounted on a so-called series hybrid vehicle for generating power. In this case, for example, the abnormality diagnosis can be carried out when the internal combustion engine is operated at a predetermined operation point for generating power (throttle opening degree and engine speed are fixed).

In addition, in case where there is an abnormality in the blow-by gas recirculation system as a result of the determination, the abnormality may be notified to a driver of the vehicle by, for example, lightning of a warming lamp, in order to urge the driver to repair it.

Although, in the above embodiment, internal combustion engine 1 has a system configuration equipped with a turbocharger, the present invention can also be applied to an internal combustion engine equipped with no turbocharger. That is, the present invention can also be applied to a system in which compressor 9 is omitted in FIG. 1.

The embodiment mentioned above is one relating to an abnormality diagnostic method for internal combustion engine 1 and to an abnormality diagnostic device for internal combustion engine 1.

The invention claimed is:

1. A method for diagnosing an abnormality of an internal combustion engine, comprising:

detecting, during a predetermined operation state in which an opening degree of a first intake throttle valve for controlling an intake air amount of the internal combustion engine is fixed, a first intake air amount when an opening degree of a second intake throttle valve positioned on an upstream side of the first intake throttle valve is set to a predetermined first valve opening degree and a second intake air amount when the opening degree of the second intake throttle valve is set to a predetermined second valve opening degree smaller than the first valve opening degree, by an intake air amount detecting sensor positioned more on an upstream side than the second intake throttle valve; and diagnosing a presence of an abnormality in a blow-by gas recirculation system for blow-by gas treatment connected to a position more on a downstream side than the intake air amount detecting sensor in an intake passage, on a basis of the first intake air amount and the second intake air amount, wherein, during detecting the first intake air amount and the second intake air amount, when the opening degree of the first intake throttle valve is varied, the diagnosis for the blow-by gas recirculation system is stopped.

2. The method for diagnosing the abnormality of the internal combustion engine according to claim 1, wherein the predetermined operation state is an operation state in which a predetermined fuel cut condition is made and a fuel injection of the internal combustion engine is stopped.

3. The method for diagnosing the abnormality of the internal combustion engine according to claim 1, wherein the first intake air amount is an intake air amount when a predetermined time has elapsed after the opening degree of the second intake throttle valve is varied to the first valve opening degree, and wherein the second intake air amount is an intake air amount when a predetermined time has elapsed after the opening degree of the second intake throttle valve is varied to the second valve opening degree.

4. The method for diagnosing the abnormality of the internal combustion engine according to claim 1, wherein the blow-by gas recirculation system includes a first passage connecting a position between the first intake throttle valve and the second intake throttle valve in the intake passage with a crankcase of the internal combustion engine.

5. The method for diagnosing the abnormality of the internal combustion engine according to claim 1, wherein the blow-by gas recirculation system includes a second passage connecting a position more on an upstream side than the second intake throttle valve in the intake passage with a crankcase of the internal combustion engine.

6. The method for diagnosing the abnormality of the internal combustion engine according to claim 1, wherein the blow-by gas recirculation system includes a third passage connecting a position more on a downstream side than the first intake throttle valve in the intake passage with a crankcase of the internal combustion engine.

7. A device for diagnosing an abnormality of an internal combustion engine, comprising:

a first intake throttle valve for controlling an intake air amount of the internal combustion engine;

a second intake throttle valve positioned on an upstream side of the first intake throttle valve;

an intake air amount detecting sensor positioned on an upstream side of the second intake throttle valve and configured to detect the intake air amount;

a blow-by gas recirculation system for blow-by gas treatment connected to a position more on a downstream side than the intake air amount detecting sensor in an intake passage; and a diagnosis section configured to diagnose an abnormality in the blow-by gas recirculation system, on a basis of a first intake air amount detected by the intake air amount detecting sensor when an opening degree of the second intake throttle valve is set to a predetermined first valve opening degree and a second intake air amount detected by the intake air amount detecting sensor when the opening degree of the second intake throttle valve is set to a predetermined second valve opening degree smaller than the first valve opening degree, during a predetermined operation state in which an opening degree of the first intake throttle valve is fixed, wherein, during detecting the first intake air amount and the second intake air amount, when the opening degree of the first intake throttle valve is varied, the diagnosis for the blow-by gas recirculation system is stopped.

* * * * *